United States Patent
Ueda

(10) Patent No.: US 7,137,770 B2
(45) Date of Patent: Nov. 21, 2006

(54) TRANSPORTING APPARATUS WITH POSITION DETECTION SENSOR

(75) Inventor: Katsuhiko Ueda, Shiga-ken (JP)

(73) Assignee: Daifuku Co., Ltd., Osaka (JP)

( * ) Notice: Subject to any disclaimer, the term of this patent is extended or adjusted under 35 U.S.C. 154(b) by 337 days.

(21) Appl. No.: 10/885,463

(22) Filed: Jul. 6, 2004

(65) Prior Publication Data

US 2005/0036858 A1 Feb. 17, 2005

(30) Foreign Application Priority Data

Jul. 11, 2003 (JP) ............................. 2003-273280
Apr. 21, 2004 (JP) ............................. 2004-125488

(51) Int. Cl.
*B66F 9/24* (2006.01)
*B65F 9/12* (2006.01)
*B65F 9/07* (2006.01)

(52) U.S. Cl. ........................ 414/274; 901/47; 700/259; 700/218

(58) Field of Classification Search ................ 414/274; 187/394; 294/907; 901/46–47; 250/224; 700/218, 258–259
See application file for complete search history.

(56) References Cited

U.S. PATENT DOCUMENTS

| | | | | |
|---|---|---|---|---|
| 3,554,390 A | * | 1/1971 | Saul | ............................ 414/273 |
| 3,557,977 A | * | 1/1971 | Atwater et al. | ............. 414/282 |
| 3,662,860 A | * | 5/1972 | Burch | ........................ 187/394 |
| 3,973,685 A | * | 8/1976 | Loomer | ....................... 414/273 |
| 4,299,496 A | * | 11/1981 | Lord | ........................... 356/446 |
| 5,091,685 A | * | 2/1992 | Sorensen et al. | ........... 318/652 |
| 5,798,920 A | * | 8/1998 | Crucius et al. | ................ 700/66 |
| 5,815,085 A | * | 9/1998 | Schneider et al. | ......... 340/3.31 |
| 6,332,750 B1 | * | 12/2001 | Donner et al. | ........... 414/796.9 |
| 6,490,504 B1 | * | 12/2002 | Son | ........................... 700/245 |
| 6,618,645 B1 | * | 9/2003 | Bacchi et al. | ............... 700/254 |

FOREIGN PATENT DOCUMENTS

| | | | |
|---|---|---|---|
| JP | 55-46411 | | 4/1980 |
| JP | 63047207 | * | 2/1988 |
| JP | 63047208 A | * | 2/1988 |
| JP | 04-101907 | | 4/1992 |
| JP | 10-265008 | | 10/1998 |
| JP | 2000-219498 | | 8/2000 |

\* cited by examiner

*Primary Examiner*—Eileen D. Lillis
*Assistant Examiner*—Charles Greenhut
(74) *Attorney, Agent, or Firm*—The Webb Law Firm

(57) ABSTRACT

A transporting apparatus is provided with a moving platform capable of moving vertically, an article loading platform that can be moved horizontally with respect to the moving platform, a contactless sensor provided on the moving platform, a detected member that is provided on the article loading platform, whose position can be altered between an position detected and a position not detected by the contactless sensor, and an operating member operatively linked to the detected member. The operating member can come into contact with an article loaded on the article loading platform, and changes the position of the detected member between the detected position and the non-detected position. Due to this configuration, it is possible to provide an article position sensor between the article loading platform and the moving platform without using wires, which are deteriorated due to the relative movement between the article loading platform and the moving platform.

14 Claims, 11 Drawing Sheets

TRANSPORTING APPARATUS WITH POSITION DETECTION SENSOR

BACKGROUND OF THE INVENTION

The present invention relates to transporting apparatuses used in automated warehouses, and more specifically to transporting apparatuses in which a loading platform for transporting articles is provided that is capable of horizontally advancing and retreating to a moving platform that is raised and lowered.

Such a transporting apparatus is disclosed for example in JP 2000-219498A (paragraphs [0017] and [0018], FIGS. 1 and 2), and is an apparatus for transporting articles set on an article loading platform. This apparatus has a vehicle that moves horizontally near the ground, a support column fixed to the vehicle and extending vertically, a raising and lowering stand that moves vertically along this support column, and an article loading platform on which articles are loaded and which can move between a home position and an extended position with respect to the raising and lowering stand. In the position opposite a desired article storage portion, by moving the article loading platform from the raising and lowering stand to the extended position, the article loading platform is inserted under the article, and then by raising up the article loading platform the article is loaded onto the article loading platform and removed from the article accommodating portion. Then, by withdrawing the article loading platform after lowering it with respect to the article through the lowering operation of the raising and lowering stand, the article is stored within the article storage portion.

With this type of transporting apparatus, if there is a change in the position or orientation of an article placed on the article loading platform due to inertia during transfer, for example, then when storing the article in the article storage portion, the article is interfered with by partition frames of the article storage portion. To prevent this from occurring, measures such as stopping operation were necessary.

Thus, conventionally there were devices in which an article loading state detection sensor was provided on the article loading platform, which detected the occurrence of a change in the article loading state by detecting the absence of an article in a detected position of the article loading platform.

SUMMARY OF THE INVENTION

If such conventional detection technology is adopted, then a cable is provided spanning between the article loading platform and a moving platforms such as the raising and lowering stand, in order to obtain detection information from the article loading state detection sensor. In this case, the cable is bent or stretched because each time the article loading platform is advanced or retreated the article loading state detection sensor moves together with the article loading platform, resulting in a greater likelihood that problems will arise in the usage life of the cable.

It is an object of the present invention to provide a transporting apparatus that is capable of detecting changes in the article loading state while achieving an improvement in system life, even when detection information is obtained by a cable connected to the article loading state detection sensor.

In order to achieve this object, the transporting apparatus according to the present invention is provided with an article loading state detection sensor on the moving platform, and the article loading platform is provided with a detected member that is contactlessly detected by the sensor. Thus, it is possible to detect changes in the article loading state without providing a cable between the moving platform and the article loading platform.

DETAILED DESCRIPTION OF PREFERRED EMBODIMENTS

Embodiments of the present invention are described below using the drawings.

First Embodiment

Figure 1:
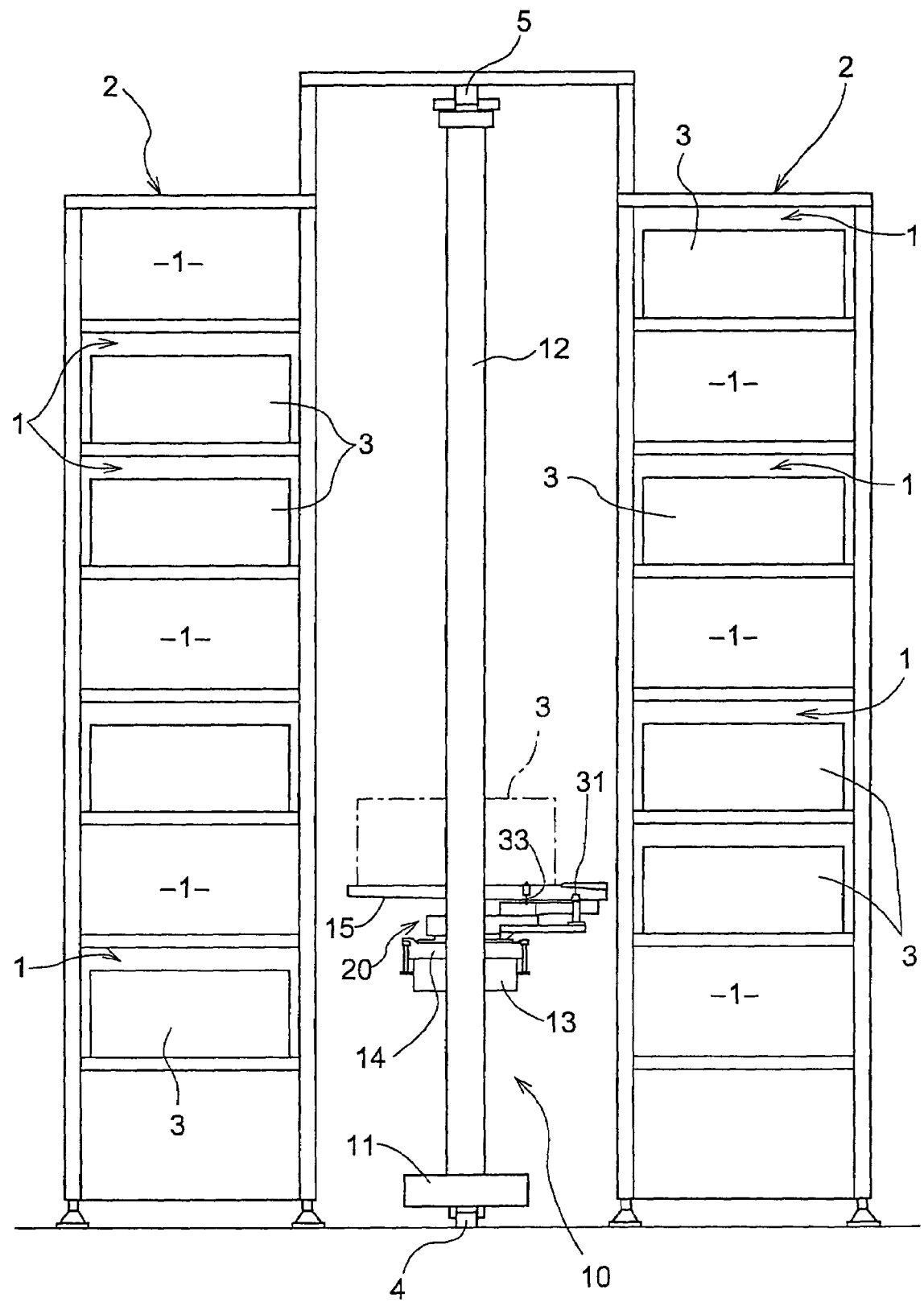
FIG. 1 is a front view of an automated warehouse.

As shown in FIG. 1, an automated warehouse has a pair of storage shelves 2, and each storage shelf 2 has a plurality of article storage portions 1 provided lined up horizontally and vertically. The pair of storage shelves 2 are arranged side by side on the floor such that their front face sides face each other with a predetermined space between them. A transporting apparatus 10 is provided between the storage shelves 2.

The transporting apparatus 10 is operated automatically based on an operation command, and moves between the storage shelves 1 and an article delivery portion (not shown) positioned to the side of the storage shelves 2. The transporting apparatus 10 is capable of removing an article that has been carried, stored in a receptacle 3, to the article delivery portion from the article delivery portion with the article still being stored in the receptacle, transporting it to an article storage portion 1 of a predetermined storage shelf 2, and storing it in the article storage portion 1 while being stored within the receptacle 3. It is also capable of removing an article that has been stored in an article storage portion 1 of the storage shelves 2 from that article storage portion 1 while that article is still stored within the receptacle 3 and transporting it to the article delivery portion, thereby transporting the article to the article delivery portion while the article is still stored within the receptacle 3.

Figure 5:
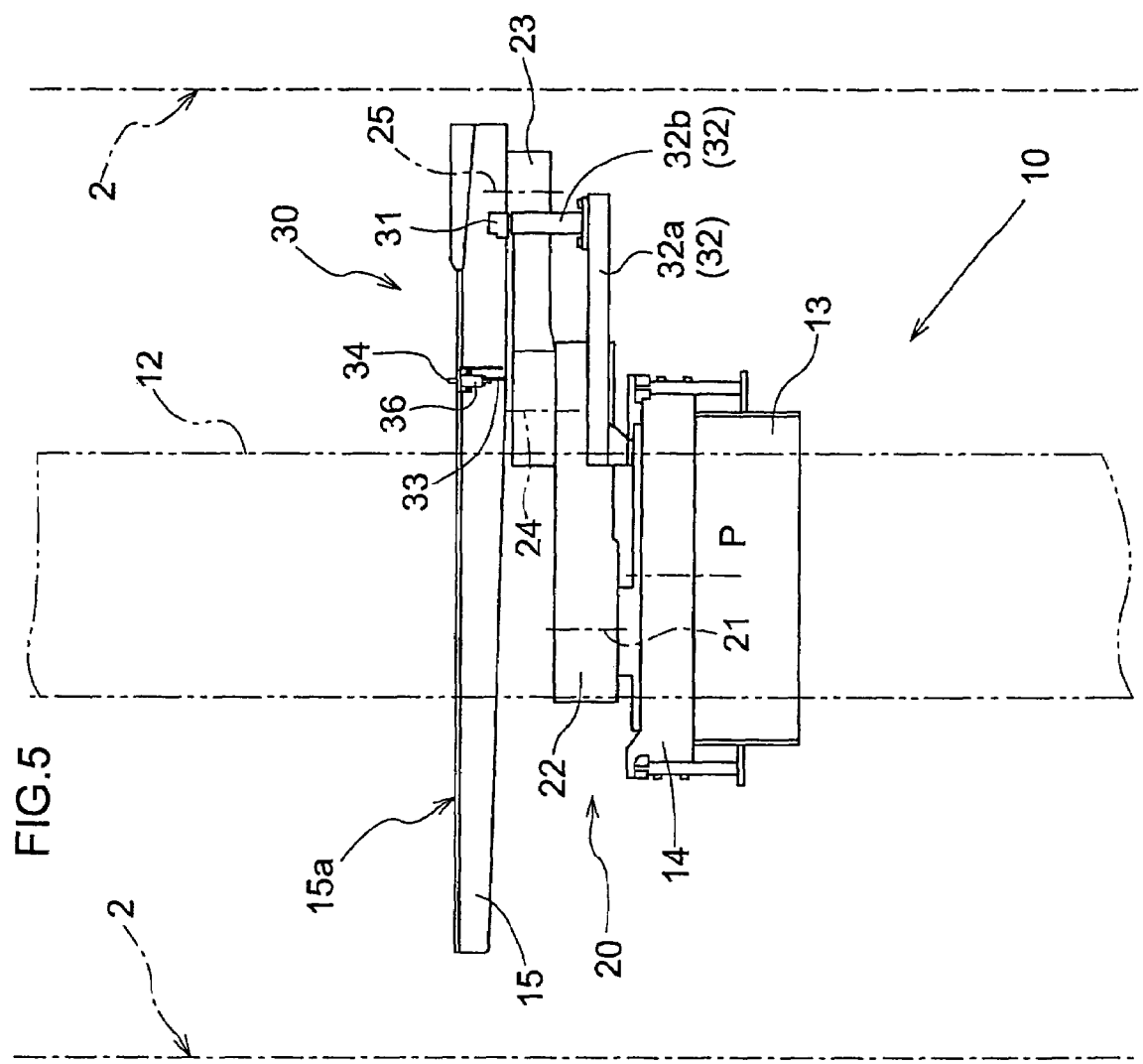
FIG. 5 is a front view showing the retreated state of the article loading platform in the transporting apparatus.

As shown in FIG. 1 and FIG. 5, for example, the transporting apparatus 10 has a configuration in which it is provided with a mobile truck 11 that is moved by the drive force of a travel motor (not shown) along a floor-side guide rail 4 and a ceiling side guide rail 5 provided between the storage shelves 2, a raising and lowering stand 13 provided such that it can move up and down on a vertical support column 12 of the mobile truck 11 and such that it can be raised and lowered by an raising and lowering motor (not illustrated), a revolving stand 14 provided above the raising and lowering stand 13 such that it can revolve freely about an axis P that runs vertical to the transporting apparatus and such that it is rotated by a revolving motor (not illustrated), and an article loading platform 15 provided above the revolving stand 14 such that it is supported via a link mechanism 20.

Figure 3:
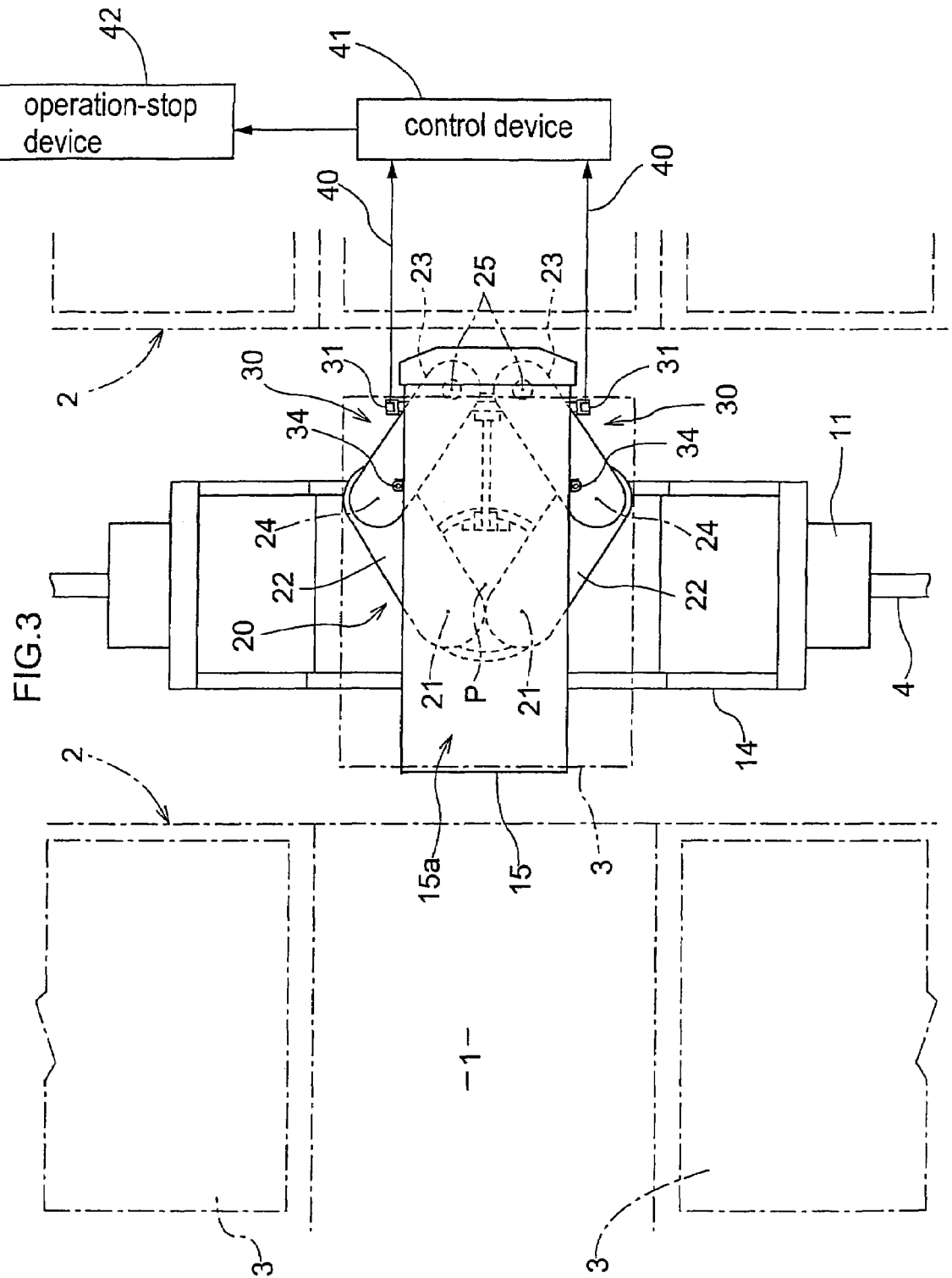
FIG. 3 is a plan view showing the retreated state of the article loading platform in the transporting apparatus.

As shown in FIG. 3 and FIG. 5, for example, the link mechanism 20 has operative links 22 and swinging links 23. Base ends of the operative links 22 are supported at two positions on the upper surface side of the revolving stand 14 in a manner such that they can rotate about vertical shafts 21. The swinging links 23 are linked to the free ends of the corresponding operative links 22 and to the lower surface side of the article loading platform 15.

The pair of operative links 22 swing about the shafts 21 due to a reciprocating electric motor (not illustrated) provided on the lower surface side of the revolving stand 14. The respective swinging links 23 are linked to the movable end side of the operative links 22 such that they are capable of rotating about a vertical axis 24, and are linked to the base end of the article loading platform 15 such that they are capable of rotating about a vertical axis 25.

Thus, the link mechanism 20 swings the pair of operative links 22 about their respective axes 21 using the reciprocating electric motor to push and pull the base end of the article loading platform 15 via the pair of swinging links 23 and thereby advance and retract the article loading platform forward and backward with respect to the revolving stand 14. After the orientation of the article loading platform 15 with respect to the raising and lowering stand 13 is adjusted through the revolving operation the revolving stand 14 such that the front end of the article loading platform 15 faces two accommodation shelves 2, the article loading platform is switched between a protruding state shown in FIGS. 2 and 4 for article storage and article removal, in which it is significantly protruding toward the storage shelf 2 from the revolving stand such that the front end side of the article loading platform 15 reaches the article storage portion 1, and a retreated state as shown in FIGS. 3 and 5 in which the entire the article loading platform 15 is retreated more toward the revolving stand 14 than in the protruding state.

That is, the transporting apparatus 10 stores and retrieves articles as described below.

When retrieving articles, the revolving stand 14 is moved vertically and horizontally along the front surface of the storage shelves 2 due to movement of the mobile truck 11 and the rising and falling of the raising and lowering stand 13, moving the article loading platform 15 to an article storage portion 1 from which an article is to be retrieved. By rotating the revolving stand 14, the article loading platform 15 is set to a predetermined position and attachment orientation for the article storage portion 1 from which an article is to be retrieved. Next, the article loading platform 15 is switched to the protruding state by the link mechanism 20 to insert the front end side of the article loading platforming 15 below the receptacle 3 stored in the article storage portion 1. Then, the revolving stand 14 is raised upward due to the raising operation of the raising and lowering stand 13 and raises the article loading platform 15 with respect to the receptacle 3, the revolving stand 14 is risen slightly due to the raising action of the raising and lowering stand 13 even after a loading surface 15a of the article loading platform 15 abuts against a lower surface of the receptacle 3, and the receptacle 3 is lifted from the article storage portion 1 by the article loading platform 15, setting the receptacle 3 onto the loading surface 15a of the article loading platform 15. Next, the article loading platform 15 is switched to the retreated state by the link mechanism 20, thereby removing the receptacle 3 from the article storage portion 1 and holding the article placed on the article loading platform 15 with it being still stored within the receptacle 3. In this state, when the article is carried to the article delivery portion due to the raising and lowering operation of the raising and lowering stand 13 and the movement of the mobile truck 11, and when the article arrives at the article delivery portion, the article is supplied to the article delivery portion from the article loading platform 15 with it still being stored within the receptacle 3.

When performing the storage of an article, the receptacle 3 accommodating the article is received on the article loading platform 15 from the article delivery portion, and is retained loaded on the article loading platform 15. In this state, through movement of the mobile truck 11 and the raising and lowering operation of the raising and lowering stand 13, the revolving stand 14 is moved horizontally and vertically along the front surface of the storage shelves 2, moving the article loading platform 15 to the article storage portion 1 in which the article is to be stored. By the rotating the revolving stand 14, the article loading platform 15 is set to the predetermined position and orientation for the article storage portion 1 in which the article is to be stored. Next, the article loading platform 15 is switched to the protruding state by the link mechanism 20 to insert the front end side of the article loading platform 15 into the article storage portion 1. Next, the article loading platform 15 is lowered with respect to the article storage portion 1 by lowering the revolving stand 14 through the lowering operation of the raising and lowering stand 13. The revolving stand 14 is further lowered slightly by lowering the raising and lowering stand 13 even after the receptacle 3 loaded on the article loading platform 15 is abutted against a receptacle catch portion of the article storage portion 1, and by moving the article loading platform 15 down away from the receptacle 3, the receptacle 3 is placed on the receptacle catch portion of the article storage portion 1, storing the article and the receptacle 3 together in the article storage portion 1.

As shown in FIG. 3, article loading state detection mechanisms 30, each provided with an article loading state detection sensor 31, are provided on both sides of the article loading platform 15. Moreover, a control device 41 linked by an electric communications cable 40 to the article loading state detection sensor 31 of each article loading state detection mechanism 30 is linked to an operation-stop device 42 of the transporting apparatus 10

The control device 41 has a microcomputer, and based on detection information from each article loading state detection sensor 31, determines whether a change has occurred in the article loading state on the article loading platform 15. If it determines that no change has occurred in the article loading state, then by outputting a signal for canceling the operation-stop of the transporting apparatus 10 to the operation-stop device 42, operation of the mobile truck 11, the raising and lowering stand 13, the revolving stand 14, and the link mechanism 20 of the transporting apparatus 10 in accordance with an operation command from an operation device (not shown) is allowed. If it is determined that a change in the article loading state has occurred, then by outputting a signal for stopping operation of the transporting apparatus 10 to the operation-stop apparatus 42, the operation stop apparatus is given priority over operation commands from the operation device (not shown) and stops operation of the mobile truck 11, the raising and lowering stand 13, the revolving stand 14 and the link mechanism 20 of the transporting apparatus 10.

That is, when the transporting apparatus 10 is operated with a change in the article loading state having occurred in the article loading platform 15, the receptacle 3 may collide with frame members or shelving material provided in the storage shelves 2 for partitioning for the article storage portions 1 and allow the receptacle to be loaded. Thus, even if a change has occurred in the article loading state, operation of the transporting apparatus 10 is automatically stopped by the control device 41 automatically operating the operation-stop device 42, allowing problems such as receptacle collision to be avoided.

Figure 2:
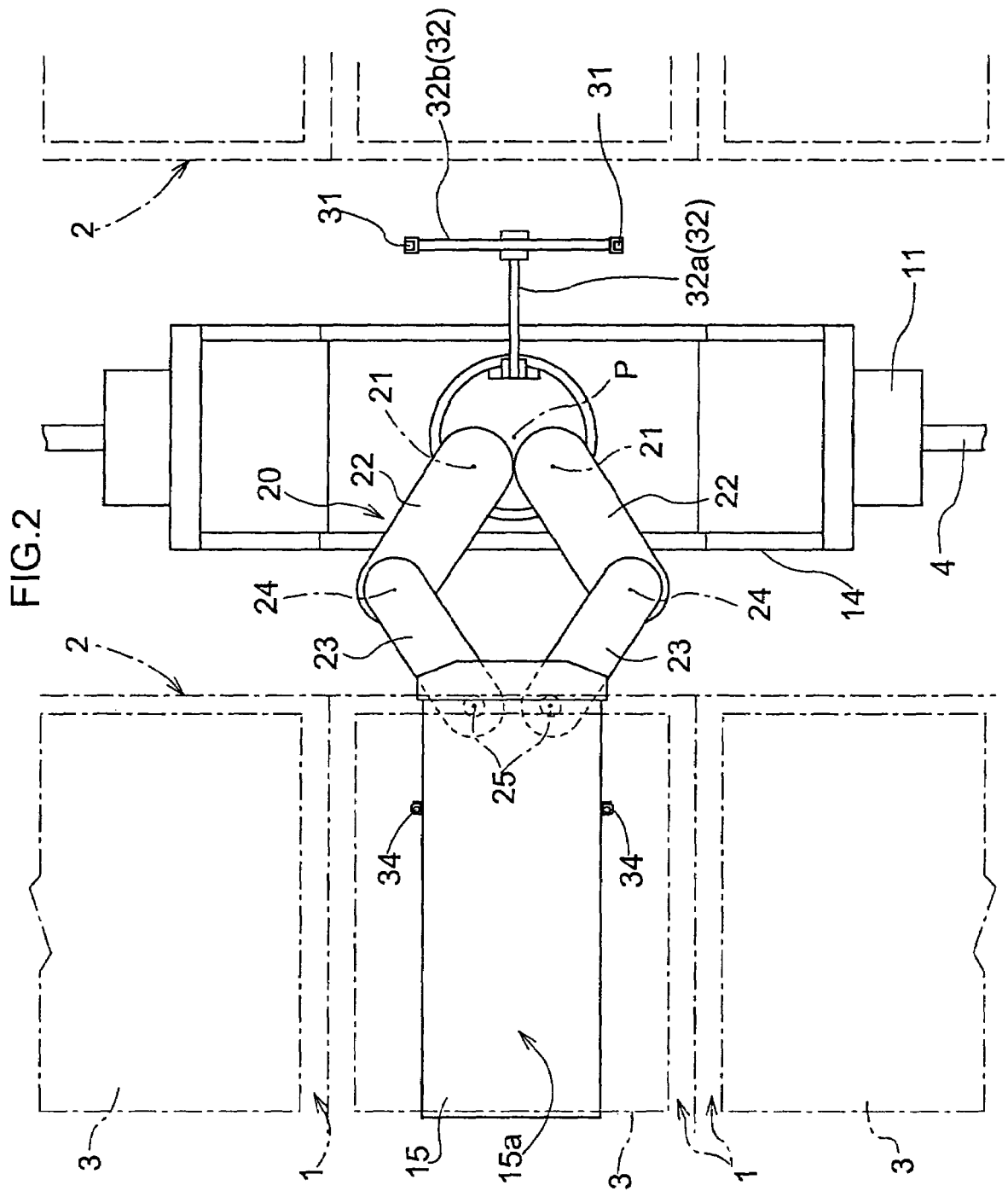
FIG. 2 is a plan view showing the protruding state of an article loading platform in a transporting apparatus.
Figure 4:
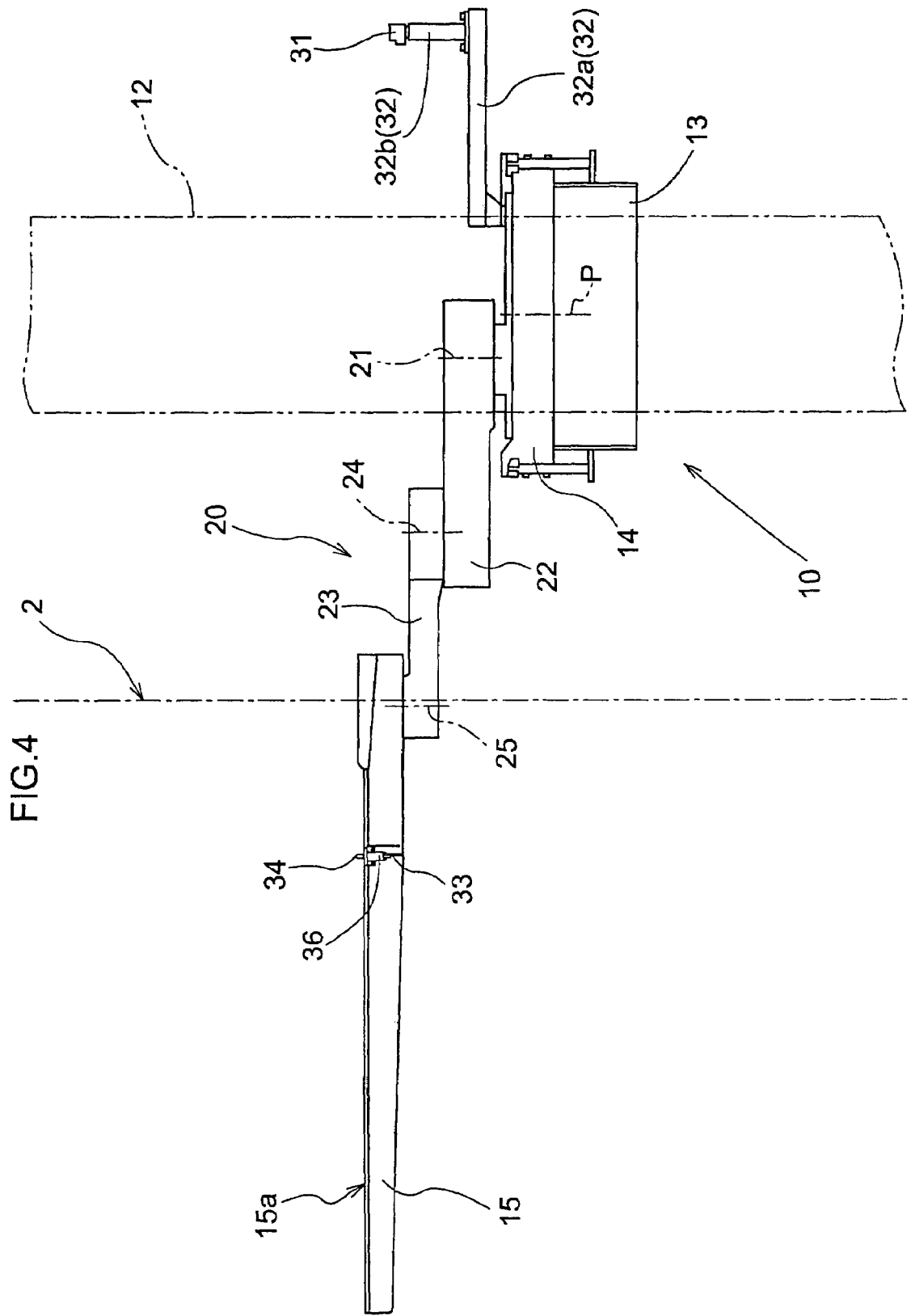
FIG. 4 is a front view showing the protruding state of an article loading platform in a transporting apparatus.

As shown in FIGS. 2, 4 and 8, for example, the pair of article loading state detection mechanisms 30 are each provided with the article loading state detection sensor 31, which is supported on the end portion of the revolving stand 14 by a sensor support portion 32, reflection plates 33 provided on both sides of the article loading platform 15, and a pin-shaped operating member 34. It should be noted that the sensor support portion 32, as shown in FIGS. 2 and 4, for example, is a provided with a main support portion 32a whose base end portion is fastened to an end portion of the revolving stand 14, and an arm portion 32b whose center portion is fastened to the tip portion of the main support portion 32a and which extends in the direction in which the mobile truck 11 moves. One end portion of the arm portion 32b supports one article loading state detection sensor 31, and its other end portion supports the other article loading state detection sensor 31.

The article loading state detection sensors 31 are laser sensors provided with a light-emitting portion (not shown) and a light-receiving portion (not illustrated) for laser light. A laser light a is emitted from the light-emitting portion, and as shown in FIG. 6, when the laser light a that is reflected by a reflective surface 33a, which is provided with reflective tape on a lateral surface of the reflection plate 33, is received by the light-receiving portion, the presence of the reflection plate is detected, and if laser light a is emitted from the light-emitting portion but the light-receiving portion does not receive the laser light a, the absence of the reflection plate 33 is detected, and result of this detection are converted into an electric signal and output to the control device 41.

Figure 7:
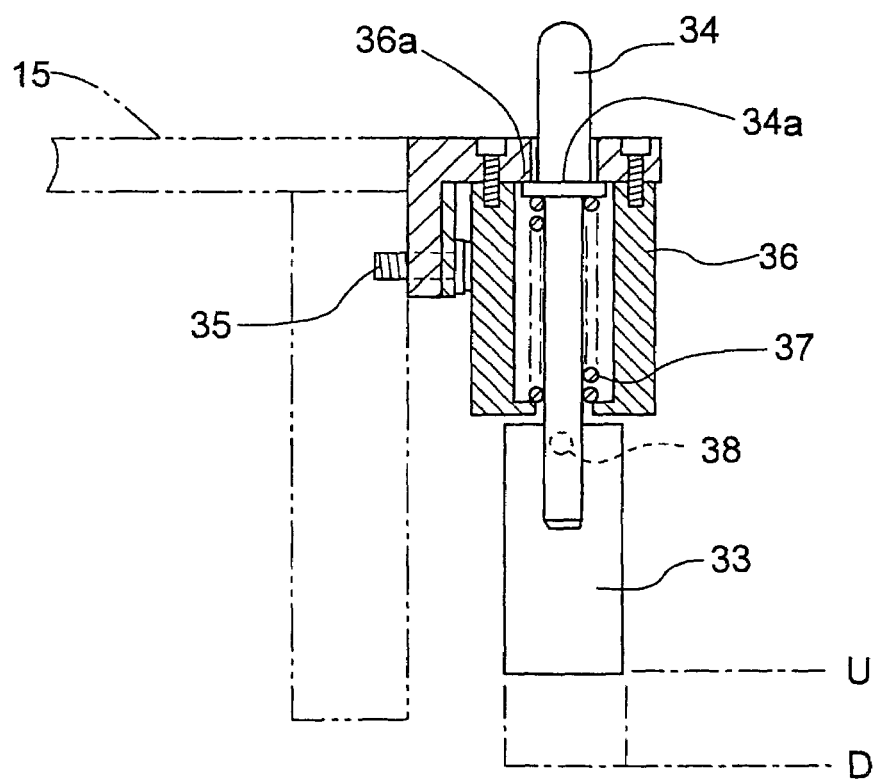
FIG. 7 is a front view of the attachment structure of a reflection plate and an operating member in the first embodiment.

As shown in FIG. 7, the operating member 34 is supported by a holder 36, which is fastened by an attachment bolt 35 to a lateral face of the article loading platform 15, in such a manner that it can freely slide in the vertical direction. The operating member 34 is urged upward to raised position where it protrudes upward from the holder 36 by a coil spring 37 provided in within the holder 36. By a spring reception portion 34a abutting against a stopper portion 36a of the holder 36, movement of the operating member 34 upwards is restricted.

Figure 6:
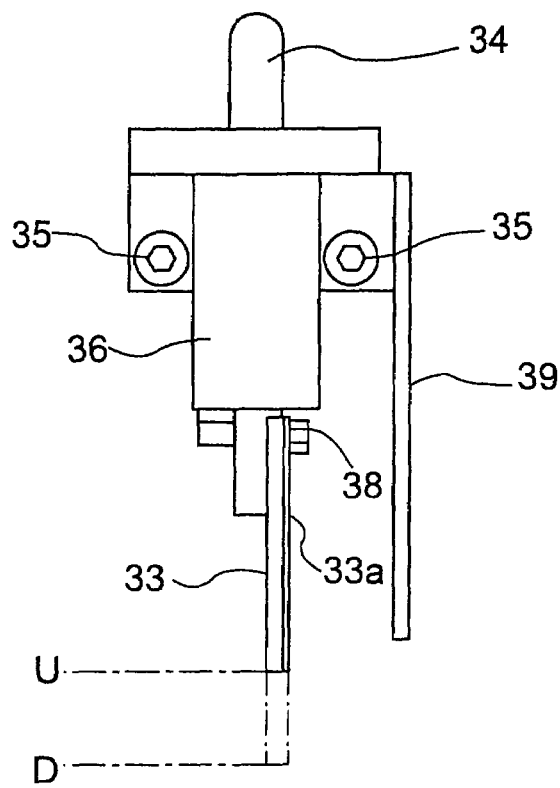
FIG. 6 is a lateral view of an attachment structure of a reflection plate and an operating member in a first embodiment.

As shown in FIGS. 6 and 7, for example, the upper end portion of the reflection plate 33 and the lower end portion of the operating member 34 are linked by a linking screw 38, and the reflection plate 33 and the operating member 34 slide vertically with respect to the article loading platform 15 as a single unit. Reference numeral 39 in FIGS. 6 and 8 denotes a cover for the operating member 34 and the reflection plate 33.

Figure 8A:
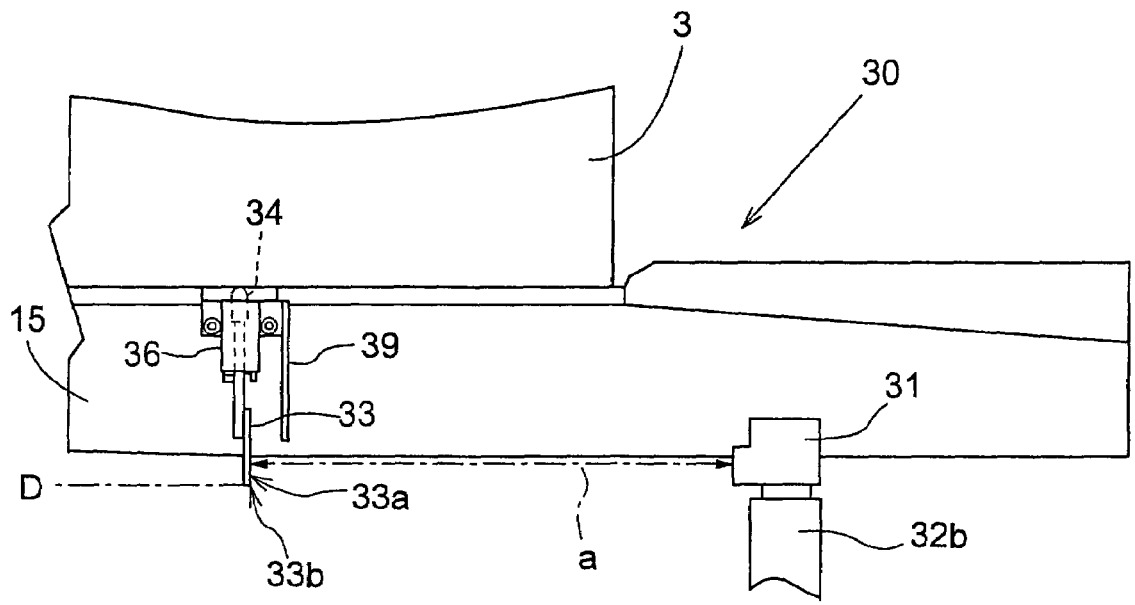
FIG. 8A is a lateral view of an article loading state detection mechanism if there is no change in the article loading state.
Figure 9A:
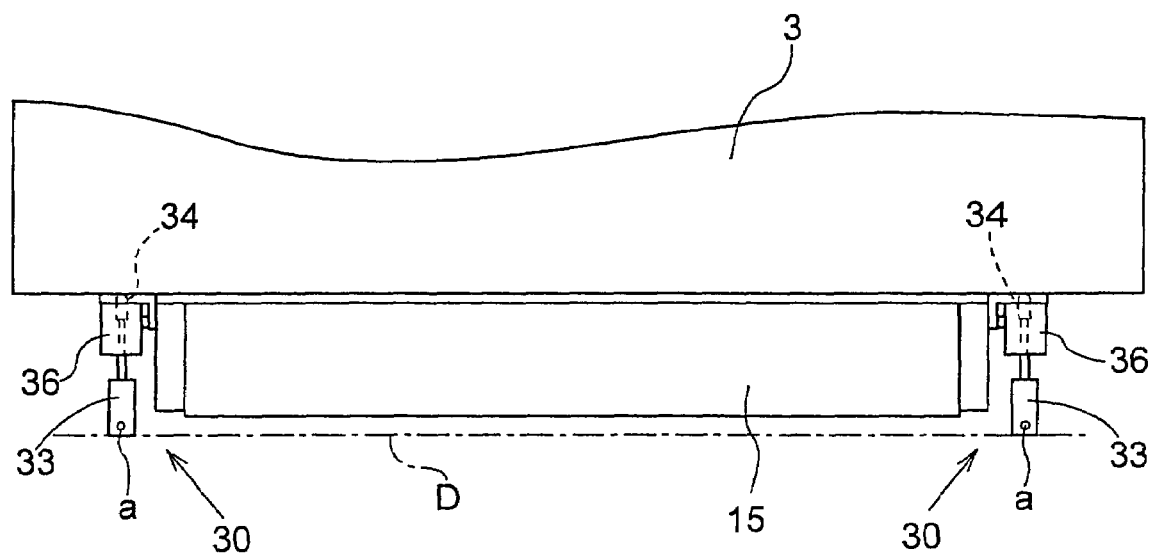
FIG. 9A is an explanatory diagram of the reflection plate if there is no change in the article loading state.

As shown in FIG. 8A and FIG. 9A, when the receptacle 3 loaded on the article loading platform 15 is in the predetermined loading position and loading orientation, then the lower surface of the side end portion of the receptacle 3 abuts against the tip of the operating member 34 and is pushed down against the resistance of the coil spring 37, and is lowered to a detection position D at which the laser light a from the article loading state detection sensor 31 hits a lower end portion 33b of the reflective surface 33a and is detected by the article loading state detection sensor 31.

Figure 8B:
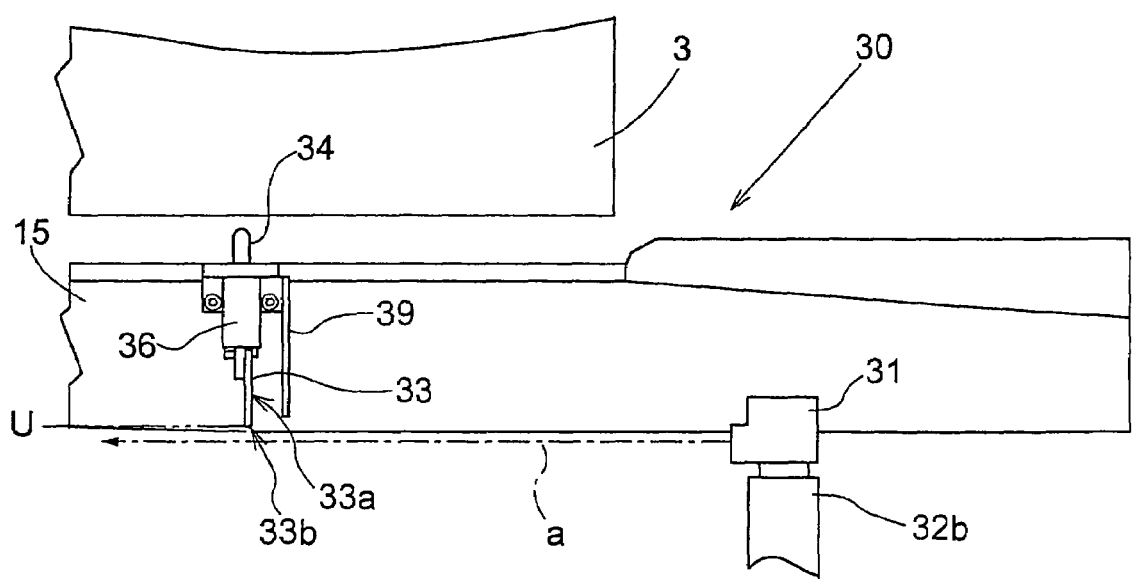
FIG. 8B is a lateral view of the article loading state detection mechanism if there is a change in the article loading state.
Figure 9B:
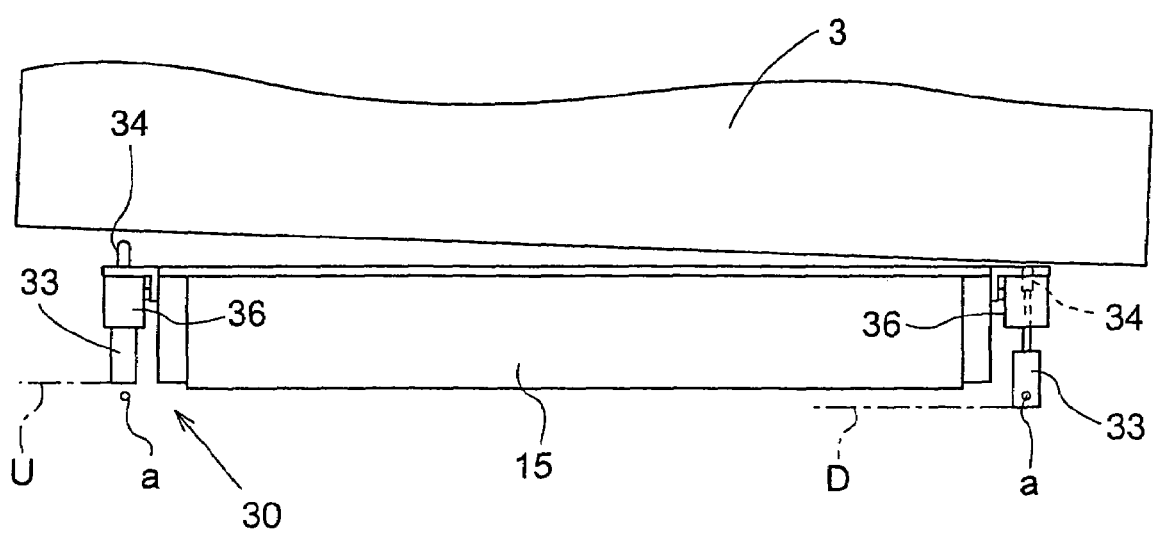
FIG. 9B is an explanatory diagram of the reflection plate if there is a change in the article loading state.

As shown in FIG. 8B and FIG. 9B, when the loading position or loading orientation of the receptacle 3 that is loaded on the article loading platform 15 changes from the predetermined loading position or loading orientation, the receptacle 3 is removed from the operating member 34, releasing the pressure on the operating member 34 by the receptacle 3, and the operating member 34 is lifted up due to the urging by the coil spring 37, raising the operating member 34 to a non-detection position U at which the laser light a from the article loading state detection sensor 31 does not hit the reflective surface 33a and is no longer detected by the article loading state detection sensor 31.

That is, each article loading state detection mechanism 30 causes the control device 41 to determine whether there has been a change in the article loading state as follows.

When no change has occurred in the article loading state on the article loading-platform 15, the receptacle 3 is present in the detected position that is provided by installing the operating member 34 at a lateral portion of the article loading platform 15, and if a change has occurred in the article loading state on the article loading platform 15, then the receptacle 3 is not in the detected position of the article loading platform 15. When there is no change in the article loading state, the operating member 34 is depressed by the receptacle 3, and due to the operating member 34, the reflection plate 33 is lowered to a lowered position D (corresponding to the article present detection position), where it is hit by the laser light a from the article loading state detection sensor 31. By the article loading state detection sensor 31 contactlessly detecting the reflection plate 33, it is detected that the receptacle 3 is in the detected position. The result of this detection is converted into an electric signal by the article loading state detection sensor 31 and output to the control device 41, which determines that a change in the article loading state has not occurred.

If a change has occurred in the article loading state, then the operating member 34 rises due to the spring 37 and the reflection plate 33 is risen up by the operating member 34 to a raised position U (corresponding to the article absent detection position) in which it is not hit by the laser light a from the article loading state detection sensor 31. By the article loading state detection sensor 31 not detecting the reflection plate 33 it is detected that the receptacle 3 in not in the detection position. The result of this detection is converted into an electric signal by the article loading state detection sensor 31 and output to the control device 41, which determines that a change in the article loading state has occurred.

Second Embodiment

A second embodiment is described below, and because this second embodiment is a separate embodiment of the structure of the operating member 34 according to the first embodiment, the operating member 34 is described in detail but other structural elements are the same as in the first embodiment and thus a detailed explanation thereof is omitted.

Figure 10:
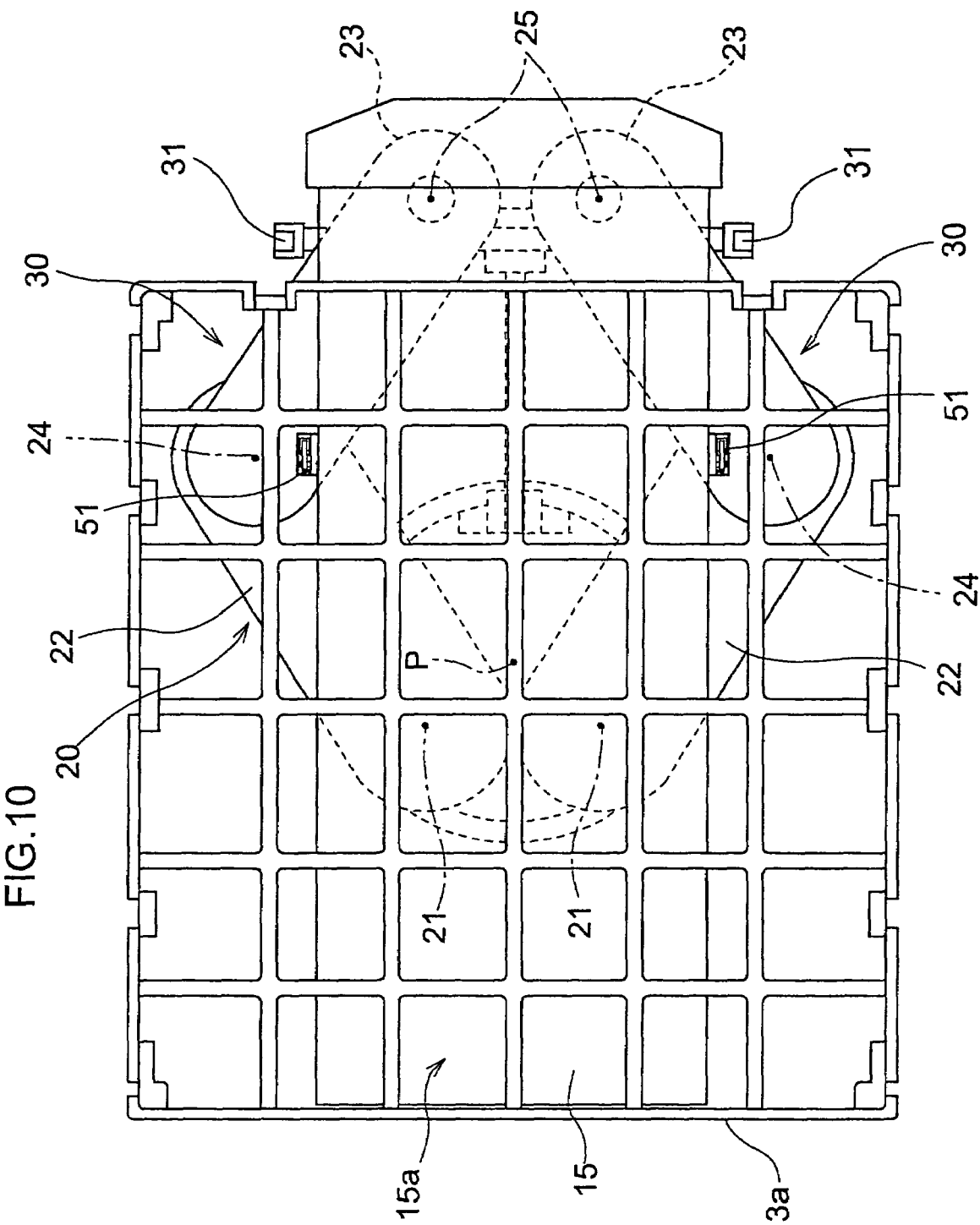
FIG. 10 is a plan view of the article loading platform of the transporting apparatus according to a second embodiment.
Figure 12:
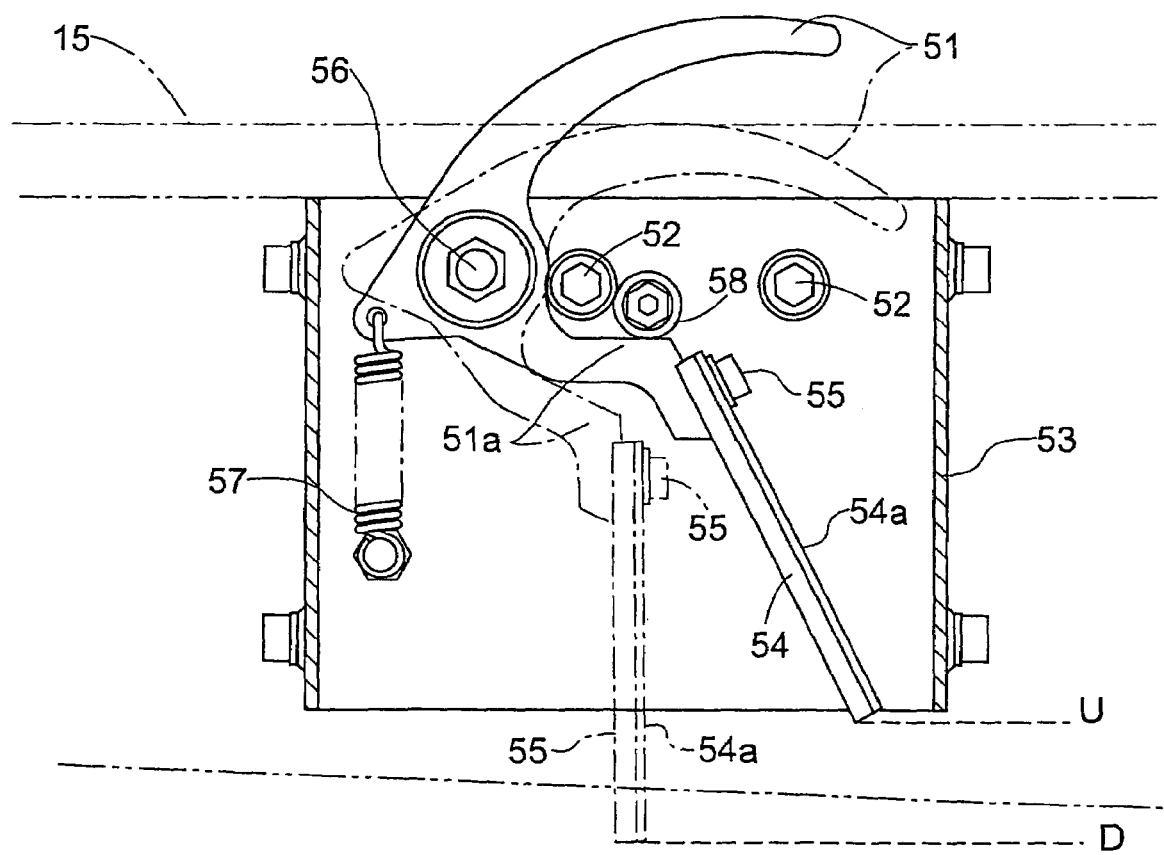
FIG. 12 is a lateral view of the attachment structure of the reflection plate and the operating member according to the second embodiment.

As shown in FIG. 10, the loaded article loaded on the article loading platform 15 is an article 3*a* whose lower surface is a grating. As shown in FIG. 12, a pair of operating members 51 are provided in the shape of a lever such that by loading the article 3*a* onto the article loading platform 15 in a predetermined loading position or loading orientation the loaded article 3*a* depresses the pair of operating members 51. In FIG. 10 only the lower surface portion of the article 3*a* is shown.

Figure 11:
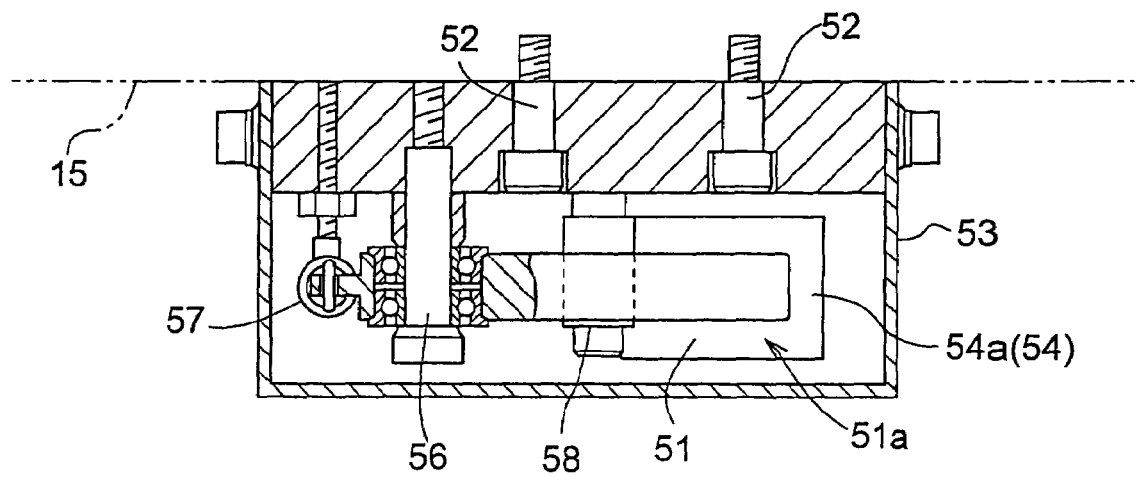
FIG. 11 is a front view of an attachment structure of a reflection plate and the operating member according to the second embodiment.

As shown in FIG. 11, when viewed in plan view, the operating members 51 are elongate plates (that is to say, elongate members) that run along the lower surface portion of the loaded article 3*a* and are long in the advancing/retreating direction of the article loading platform 15, and are provided to the side of the article loading platform 15 by a holder 53 fastened by two attachment bolts 52. When viewed from the side as in FIG. 12, the operating members 51 are curved elongate members.

The operating members 51 are directly linked to a reflection plate 54 by linking a bottom end portion thereof to an upper end portion of the reflection plate 54, which serves as the detected member, with a linking screw 55 as shown in FIG. 12. That is to say, the reflection plate 54 and the operating member 51 are provided as a single component that is capable of swinging vertically about an end portion in the length direction of the operating member 51.

That is to say, a swing shaft 56 in the horizontal direction is provided at an end portion in the length direction of the operating member 51, and the reflection plate 54 and the operating member 51 are provided capable of swinging about the swing shaft 56 as an integral unit.

Also, the operating member 51 is urged upward in FIG. 12 by a coil spring 57, and when a stopper abutment portion 51*a* of the operating member 51 abuts against a stopper 58, the operating member 51 is urged to protrude more upward than the loading surface of the article loading platform 15.

The reflection plate 54, as in the first embodiment, is provided on one side with a reflective surface 54*a* having reflective tape. As shown by the solid line in FIG. 12, when the operating member 51 is protruding above the loading surface of the article loading platform 15, the reflective plate 54 is in the article absent detection position U within the holder 53. As shown by the dashed line of FIG. 12, when the operating member 51 is pressed by the article 3*a* it swings as a single unit with the reflection plate 54 about the swing shaft 56 and is manipulated into the article present detection position D, where the reflection plate 54 is protruding below the holder 53.

Figure 13A:
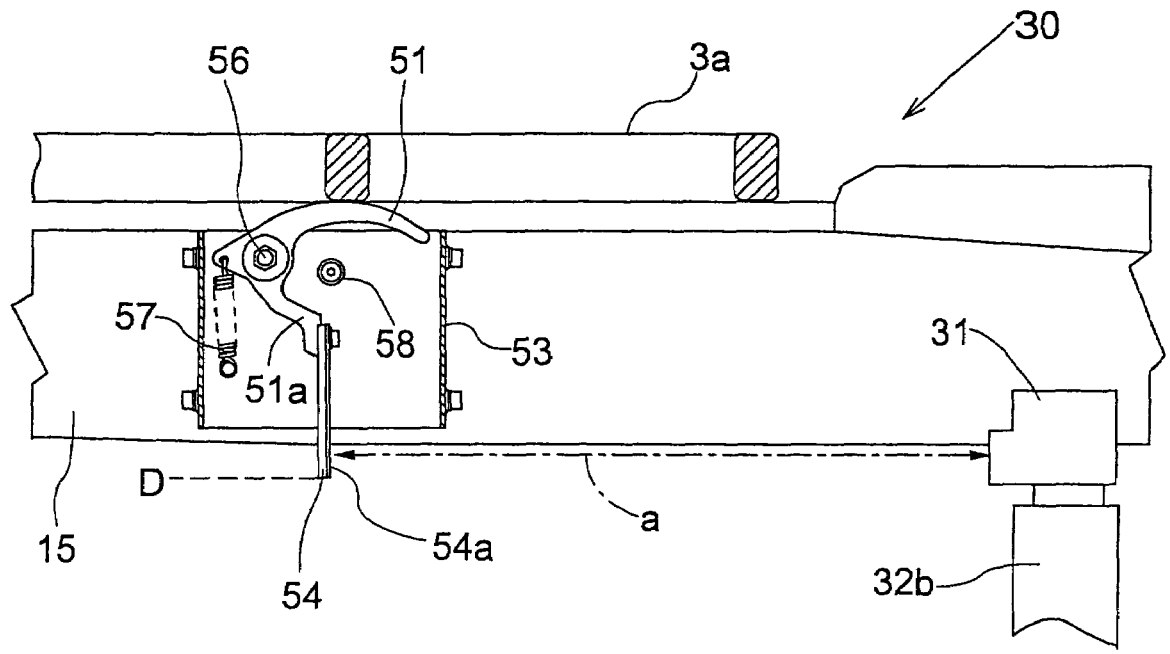
FIG. 13A is a lateral view of the article loading state detection mechanism if there is no change in the article loading state.

More specifically, as shown in FIG. 13A, when the article 3*a*, whose lower surface portion is a grating, loaded on the article loading platform is in the predetermined loading position and loading orientation, the lower surface of the side end portion of the article 3*a* is placed on the upper surface of the operating member 51 and the weight of the article 3*a* is applied to the operating member 51, bringing the operating member 51 into contact with the lower surface of the article 3*a* and depressing the operating member 51 against the resistance of the coil spring 57, thereby swinging the operating member 51 and the reflective plate 54 about the swing shaft 56 as a single unit and lowering the reflective plate 54 into the article present detection position D in which the laser light a from the article loading state detection sensor 31 hits the reflective surface 54*a* of the reflection plate 54 and is detected by the article loading state detection sensor 31.

Figure 13B:
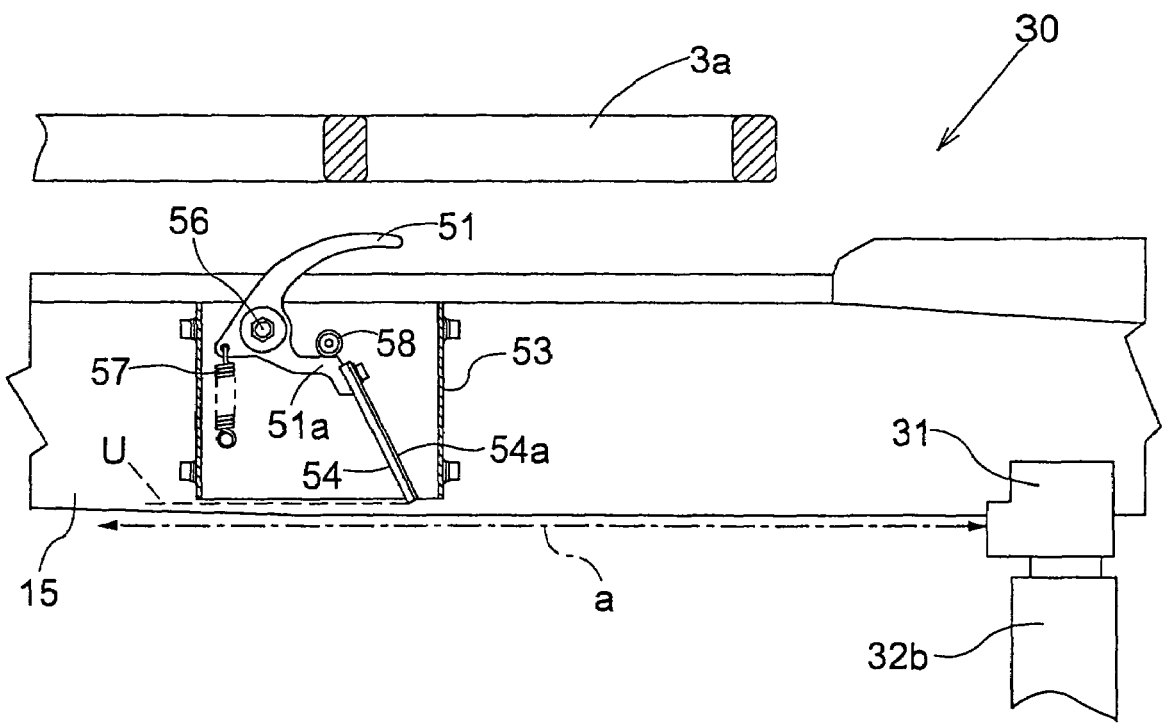
FIG. 13B is a lateral view of the article loading state detection mechanism if there is a change in the article loading state.

Furthermore, as shown in FIG. 13B, when the loading position or loading orientation of the article 3*a*, whose bottom surface is a grating, loaded on the article loading platform 15 changes from the predetermined loading position or loading orientation, the article 3*a* is dislocated upward from the vicinity of the operating member 51, releasing the pressure on the operating member 51 by the article 3*a*, and thus the operating member 51 is raised upward due to the urging of the coil spring 57, thereby swinging the operating member 51 and the reflective plate 54 about the swing shaft 56 as a single unit and raising the reflective plate 54 into the article absent detection position U, in which the laser light a from the article loading state detection sensor 31 does not hit the reflective surface 54*a* of the reflection plate 54 and is no longer detected by the article loading state detection sensor 31.

That is, the pair of article loading state detection mechanisms 30, which are made of the article loading state detection sensor 31, the reflective member 54, and the operating member 51, each causes the control device 41 to determine the presence or absence of a change in the article loading state as described below.

When no change in the article loading state on the article loading platform 15 has occurred, the article 3*a*, whose bottom surface is a grating, is present in the detected position provided by arranging the operating member 51 to the side of the article loading platform 15, and when a change in the article loading state on the article loading platform 15 has occurred, the article 3*a* becomes absent from the detected position of the article loading platform 15. When no change has occurred in the article loading state, the operating member 51 is swung due to the article 3*a*, swinging the reflective plate 34 to the article present detection position D, in which it is hit by the laser light a from the article loading state detection sensor 31. By the article loading state detection sensor 31 contactlessly detecting the reflective plate 54, the detected position is detected, indicating the presence of the article 3*a* This result of this detection is converted to an electric signal by the article loading state detection sensor 31 and output to the control device 41, which determines that no change in the article loading state has occurred.

When a change in the article loading state has occurred, the operating member 51 is swung upward by the spring 57. When this happens, the reflective plate 54 is swung to the article absent detection position U, in which it is not hit by the laser light a from the article loading state detection sensor 31, and thus the article loading state detection sensor 31 does not detect the reflective plate 54. Consequently, it is detected that the article 3*a* is not in the detected position.

The result of this detection is converted to an electric signal by the article loading state detection sensor 31 and output to the control device 41, which determines that a change in the article loading state has occurred.

OTHER EMBODIMENTS

In the first embodiment, it is also possible to adopt a configuration in which, when the receptacle 3 of the article loading platform-15 comes into contact with the operating member 34 and the operating member 34 is pressed by the receptacle 3, the laser light a from the article loading state detection sensor 31 does not hit the reflective plate 33 and thus the reflective plate 33 is no longer detected by the article loading state detection sensor 31, and when the receptacle 3 on the article loading platform 15 is away from the operating member 34 and the operating member 34 is manipulated by the urging force, the laser light a from the article loading state detection sensor 31 hits the reflective plate 33 and thus the reflective plate 33 is detected by the article loading state detection sensor 31. In this case, the position of the reflective plate 33 when the reflective plate is no longer detected by the article loading state detection sensor 31 is the article present detection position, and the position of the reflective plate 33 when the reflective plate is detected by the article loading state detection sensor 31 is the article absent detection position.

Also, in the second embodiment as well, it is possible to adopt a configuration in which, when the article 3a of the article loading platform 15 comes into contact with the operating member 51 and the operating member 51 is pressed by the article 3a, the laser light a from the article loading state detection sensor 31 does not hit the reflective plate 54 and thus the reflective plate 54 is no longer detected by the article loading state detection sensor 31, and when the article 3a on the article loading platform 15 is away from the operating member 51 and the operating member 51 is manipulated by the urging force, the laser light a from the article loading state detection sensor 31 hits the reflective plate 54 and thus the reflective plate 54 is detected by the article loading state detection sensor 31.

The present invention, in the first and second embodiments described above, was described for a configuration in which an article is loaded onto the article loading platform still stored within the receptacle 3, but it can also be adopted for a case in which an article is loaded directly onto the article loading platform 15 without being placed within a receptacle. Thus, the receptacle 3 and the article are referred to generically as articles 3 and 3a.

In the implementation of the present invention, the object of the present invention can also be achieved by employing various contactless sensors, such as an ultrasound sensor that performs detection using ultrasound, or a magnetic sensor that performs detects using magnetism, in addition to a detection sensor that performs detection using laser light as described in the foregoing embodiments, as the article loading state detection sensor 31. Consequently, the laser sensor 31, an ultrasound sensor and a magnetic sensor and the like are referred to generically as the article loading state detection sensor 31, and the reflective plate 33 is referred to as the detected member 33.

Moreover, it is also possible to adopt a configuration in which the detected member is not a reflective plate that reflects light or sound or the like from the article loading state detection sensor, but rather a radiation device responds to these energies and actively radiates energy such as light or sound to the article loading state detection sensor.

The present invention can also be adopted for various transporting apparatuses configured such that articles are moved in and out through the raising and lowering of an article loading platform, such as transporting apparatuses that employ an article loading platform to move articles to and from a plurality of stations arranged side by side on the route over which the transporting apparatus is moved. In this case, as with a stacker crane, it is not necessary to raise or lower or rotate the article loading platform, and thus it is possible to adopt a configuration in which a support stand on which the article loading platform is provided in such a manner that it can be freely advanced and retreated is manipulated upward or downward only by the amount that the article loading platform is raised and lowered to retrieve and insert articles. Consequently, the revolving stand 14 and the support stand, for example, are referred to generically as the moving platform 14.

What is claimed is:

1. A transporting apparatus comprising:
   a moving platform capable of moving vertically;
   an article loading platform supported on the moving platform for transporting article such that the article loading platform can be moved horizontally with respect to the moving platform;
   an article loading state detection sensor provided on the moving platform;
   a detected member provided on the article loading platform, the detected member capable of switching between an article present detection position and an article absent detection position that can be contactlessly detected by the article loading state detection sensor; and
   an operating member, provided on the article loading platform, that is operatively connected to the detected member so as to move the position of the detected member, wherein the operating member is configured to be urged such that the detected member is in turn urged toward the article absent detection position, and when the operating member comes into contact with an article on the article loading platform, the operating member is manipulated into a position where the detected member is in the article present detection position due to pressure from the article.

2. The transporting apparatus according to claim 1, wherein the operating member is a curved elongate member when viewed from a side, and extending in the direction in which the article loading platform is advanced and retreated.

3. The transporting apparatus according to claim 2, wherein the detected member and the operating member are directly linked and provided such that they are capable of swinging vertically about an end portion in the length direction of the operating member.

4. The transporting apparatus according to claim 1, wherein the detected member and the operating member are directly linked, and are capable of freely sliding in the vertical direction.

5. The transporting apparatus according to claim 1, wherein the detected member is provided such that a detection position where the detected member is detected by the article loading state detection sensor is defined as the article present detection position, and a non-detection position where the detected member is not detected by the article loading state detection sensor is defined as the article absent detection position.

6. The transporting apparatus according to claim 1, wherein the detected member is provided at a plurality of locations of the article loading platform, and a plurality of article loading state detection sensors are provided such that each of the plurality of detected members is detected separately.

7. The transporting apparatus according to claim 1, wherein the moving platform is provided such that the moving platform is moved horizontally and vertically along a front surface of a storage shelf, in which a plurality of article storage portions are provided lined up horizontally and vertically.

8. A transporting apparatus comprising:
a moving platform capable of moving vertically;
an article loading platform supported to the moving platform such that the article loading platform can be moved horizontally with respect to the moving platform;
a contactless sensor provided on the moving platform;
a detected member provided on the article loading platform, whose position can be altered between a position detected and a position not detected by the contactless sensor; and
an operating member operatively linked to the detected member, wherein the operating member can come into contact with an article loaded on the article loading platform, and changes the position of the detected member between the detected position and the non-detected position.

9. A transporting apparatus according to claim 8, wherein the detection sensor has a light-emitting device and a light-receiving device, and the detected member has a reflective member that reflects light from the light-emitting device.

10. A transporting apparatus according to claim 8, wherein the position of the operating member can be changed vertically, and is urged upward.

11. A transporting apparatus according to claim 9, wherein the operating member is an elongate member extending generally in the horizontal direction.

12. A transporting apparatus according to claim 11, wherein the operating member can swing about a shaft supported on the article loading platform.

13. A transporting apparatus according to claim 12, wherein the operating member is fastened to the reflective member, and positioned within a holder.

14. A transporting apparatus according to claim 12, wherein in a state where the operating member is pressed by the article, the reflective member is fastened to the operating member such that the reflective member becomes perpendicular to the direction in which light is emitted from the light-emitting device.

* * * * *